US008558916B2

(12) United States Patent
Hayashi et al.

(10) Patent No.: US 8,558,916 B2
(45) Date of Patent: Oct. 15, 2013

(54) ELECTRONIC STILL CAMERA HAVING CACHE CONTROL FUNCTION

(75) Inventors: Masaki Hayashi, Chiba (JP); Morihiro Takagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,017

(22) Filed: Mar. 2, 2011

(65) Prior Publication Data

US 2011/0149113 A1 Jun. 23, 2011

Related U.S. Application Data

(63) Continuation of application No. 12/153,042, filed on May 13, 2008, now abandoned, which is a continuation of application No. PCT/JP2006/322848, filed on Nov. 16, 2006.

(30) Foreign Application Priority Data

Nov. 16, 2005 (JP) ................................. 2005-331687

(51) Int. Cl.
*H04N 5/76* (2006.01)

(52) U.S. Cl.
USPC .................................... 348/231.1; 348/231.9

(58) Field of Classification Search
USPC ........ 348/208.4, 231.99–231.3, 231.8, 231.9, 348/567, 208.6, 231.1; 711/5, 103, 113, 711/115, 118, 135, 151
See application file for complete search history.

(56) References Cited

U.S. PATENT DOCUMENTS

| | | | | |
|---|---|---|---|---|
| 5,293,236 | A | * | 3/1994 | Adachi et al. ............... 348/231.2 |
| 5,303,198 | A | * | 4/1994 | Adachi et al. ............. 365/185.11 |
| 5,563,655 | A | * | 10/1996 | Lathrop ...................... 348/231.9 |
| 6,470,432 | B2 | * | 10/2002 | Ozawa et al. .................. 711/167 |
| 6,529,236 | B1 | * | 3/2003 | Watanabe ................... 348/230.1 |
| 2002/0031349 | A1 | * | 3/2002 | Hayashi ........................ 396/429 |
| 2003/0074529 | A1 | * | 4/2003 | Crohas .......................... 711/115 |
| 2003/0075609 | A1 | * | 4/2003 | Kim ............................. 235/492 |
| 2004/0239800 | A1 | * | 12/2004 | Yamano et al. ............... 348/372 |

FOREIGN PATENT DOCUMENTS

| | | |
|---|---|---|
| JP | A 63-217447 | 9/1988 |
| JP | A 04-239279 | 8/1992 |
| JP | A 06-195262 | 7/1994 |
| JP | A 07-226095 | 8/1995 |
| JP | A 09-097199 | 4/1997 |
| JP | A 2002-074276 | 3/2002 |
| JP | A 2003-101969 | 4/2003 |
| JP | A 2003-141487 | 5/2003 |
| JP | A 2004-342037 | 12/2004 |

OTHER PUBLICATIONS

Japanese Office Action issued in Japanese Application No. JP 2007-545288 dated Dec. 6, 2011 (w/ English Translation).

* cited by examiner

*Primary Examiner* — Lin Ye
*Assistant Examiner* — Euel Cowan
(74) *Attorney, Agent, or Firm* — Oliff & Berridge, PLC (57) ABSTRACT

An electronic still camera includes: a detection unit that detects whether or not a detachable recording medium has a cache function; and a validating unit that validates the cache function when the detection unit detects that the recording medium has the cache function.

7 Claims, 10 Drawing Sheets

TRANSFER DATA IN SIZE SMALLER THAN CACHE MEMORY CAPACITY

| DATA A | DATA B | DATA C |
|---|---|---|

TRANSFER DATA IN SIZE GREATER THAN CACHE MEMORY CAPACITY

| DATA A1 | DATA A2 | DATA B1 | DATA B2 |
|---|---|---|---|

|←—— DATA A ——→|←—— DATA B ——→|

CACHE MEMORY CAPACITY

ELECTRONIC STILL CAMERA HAVING CACHE CONTROL FUNCTION

This is a Continuation of application Ser. No. 12/153,042 filed May 13, 2008, which in turn is a continuation of International Application No. PCT/JP 2006/322848 filed Nov. 16, 2006

INCORPORATION BY REFERENCE

The disclosures of the following applications are herein incorporated by reference:
Japanese Patent Application No. 2005-331687 filed Nov. 16, 2005 International Application No. PCT/JP 2006/322848 filed Nov. 16, 2006

BACKGROUND OF INVENTION

1. Field of the Invention

The present invention relates to an electronic still camera having a cache control function for controlling a cache in a detachable recording medium.

2. Description of Related Art

There are recording media known in the related art having a cache function engaged in conjunction with a volatile memory installed therein so as to assure efficient data record processing. Japanese Laid Open Patent Application No. H09-97199 and Japanese Laid Open Patent Application No. 2003-101969 each disclose a technology for efficiently executing data record processing and data reproduction processing by utilizing a volatile memory in a recording medium installed in a personal computer or the like.

SUMMARY OF THE INVENTION

However, the function of the volatile memory in a detachable recording medium (portable recording medium) loaded in an electronic still camera is not utilized to the maximum advantage.

An electronic still camera according to the first embodiment of the invention comprise: a detection unit that detects whether or not a detachable recording medium has a cache function; and a validating unit that validates the cache function when the detection unit detects that the recording medium has the cache function.

According to the second aspect of the invention, it is preferred that the electronic still camera according to the first aspect further comprises: a comparison unit that compares a first processing time length required to execute processing when the cache function is validated with a second processing time length required to execute the processing when the cache function is not validated, and in this electronic camera the validating unit validates the cache function if the first processing time length is smaller than the second processing time length.

According to the third embodiment of the invention, it is preferred that the electronic still camera according to the second embodiment further comprises: an arithmetic operation unit that determines through arithmetic operation the first processing time length and the second processing time length.

According to the fourth embodiment of the invention, it is preferred that the electronic still camera according to the first embodiment further comprises: an instruction unit that issues an instruction for a cache flush to the recording medium at a photographing operation completion.

According to the fifth embodiment of the invention, it is preferred that the electronic still camera according to the first embodiment further comprises: an instruction unit that issues a cache flush instruction each time a photographing operation in a single shot photographing mode completes and issues the cache flush instruction when a continuous shooting operation in a continuous shooting mode completes.

According to the sixth embodiment of the invention, it is preferred that the electronic still camera according to the first embodiment further comprises: an instruction unit that issues a cache flush instruction in synchronization with a completion of image recording processing executed to record image into the recording medium.

According to the seventh embodiment of the invention, it is preferred that in the electronic still camera according to the sixth embodiment, the instruction unit issues the cache flush instruction after photographic information transmitted to the recording medium in immediate succession to image data, is completely recorded.

According to the eighth embodiment of the invention, it is preferred that the electronic still camera according to the first embodiment further comprises: an instruction unit that issues a cache flush instruction each time a predetermined time interval elapses.

According to the ninth embodiment of the invention, it is preferred that the electronic still camera according to the fourth embodiment further comprises: a power supply control unit that ends power supply from a camera body to the recording medium after cache flush processing executed in response to the cache flush instruction completes.

According to the tenth embodiment of the invention, it is preferred that the electronic still camera according to the first embodiment further comprises: a connection detection unit that detects a connection with an external device; and an invalidating unit that invalidates the cache function having been validated by the validating unit when the connection detection unit detects the connection with the external device.

According to the eleventh embodiment of the invention, it is preferred that the electronic still camera according to the tenth embodiment further comprises: a data volume instruction unit that issues an instruction to adjust a volume of data to be transmitted to a camera body from the external device to a volume smaller than a capacity of the cache when the connection detection unit detects the connection with the external device.

According to the twelfth embodiment of the invention, it is preferred that the electronic still camera according to the second embodiment further comprises: a connection detection unit that detects a connection with an external device; and an invalidating unit that invalidates the cache function having been validated by the validating unit when the connection detection unit detects the connection with the external device.

According to the thirteenth embodiment of the invention, it is preferred that the electronic still camera according to the twelfth embodiment further comprises: a data volume instruction unit that issues an instruction to adjust a volume of data to be transmitted to a camera body from the external device to a volume smaller than a capacity of the cache when the connection detection unit detects the connection with the external device.

An electronic still camera according to the fourteenth embodiment of the invention comprises: a detection unit that detects whether or not a detachable recording medium has a cache function; a validating unit that validates the cache function when the detection unit detects that the recording medium has the cache function; a connection detection unit that detects a connection with an external device; and an invalidating unit that invalidates the cache function having been validated by the validating unit when the connection detection unit detects the connection with the external device.

According to the fifteenth embodiment of the present invention, it is preferred that in the electronic still camera according to the second invention, the processing includes transmitting data to the recoding medium and recording the transmitted data in the recording medium.

DESCRIPTION OF PREFERRED EMBODIMENTS

Figure 1:
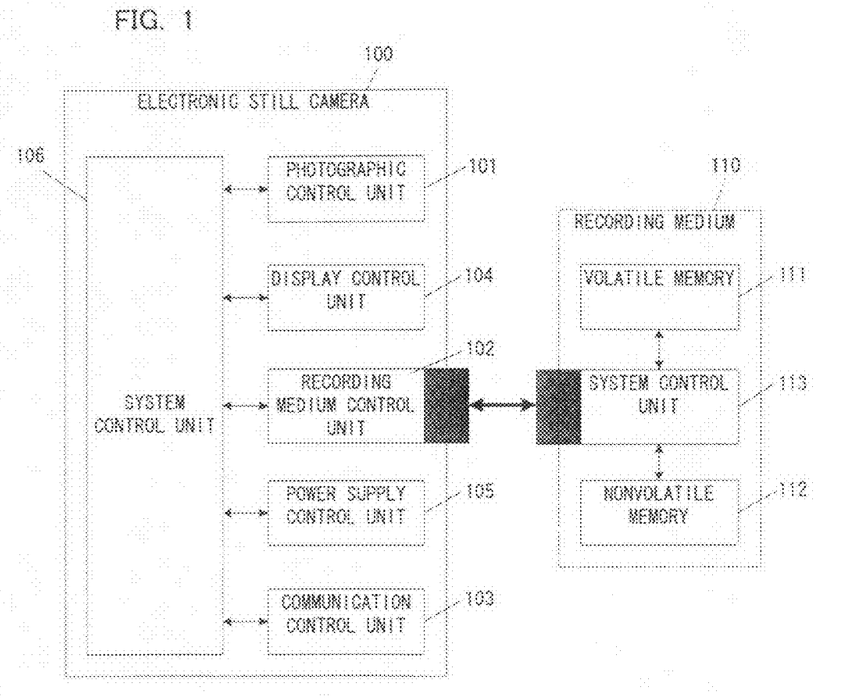
FIG. 1 illustrates the basic structure adopted in the electronic still camera achieved in an embodiment of the present invention.

In reference to FIGS. 1 through 5, an embodiment achieved by adopting the present invention in a camera is described. FIG. 1 illustrates the basic structure adopted in an electronic still camera 100 achieved in the embodiment. A photographic control unit 101 captures a subject image via a CCD or the like, executes A/D conversion on the imaging data constituting the captured image and then executes image processing on the digital data. A recording medium control unit 102 executes recording control under which image data obtained by photographing an image or data transferred from a communication control unit 103 to be detailed later are recorded into a recording medium 110, operational control on the recording medium 10, power supply control and recorded image reproduction control. The communication control unit 103 controls communication with an external device such as a personal computer. A display control unit 104 controls the operating state display or image reproduction in the electronic still camera 100. A power supply control unit 105 supplies power to the various units by monitoring the state of the power source. A system control unit 106, which includes a microcomputer and the like, executes specific arithmetic operations by using signals input thereto from the various units and outputs control signals generated based upon the arithmetic operation results to the individual units. The system control unit 106 is connected to the various units mentioned above.

The recording medium 110 is a memory device such as a memory card that can be loaded into/unloaded from the electronic still camera 100. The recording medium 110 includes a volatile memory 111, a nonvolatile memory 112 and a memory system control unit 113. The electronic still camera 100 supplies power to the recording medium 110 via the recording medium control unit 102. The volatile memory 111 is a cache memory constituted with an SRAM, which is a high-speed memory used to hold data temporarily. While a large volume of data can be stored into the nonvolatile memory 112 constituted with a flash memory, a magnetic disk or the like, its processing speed is not as high as that of the volatile memory 111. The memory system control unit 113 controls the volatile memory 111 and the nonvolatile memory 112 and writes data temporarily stored (cached) in the volatile memory 111 into the nonvolatile memory 112 as necessary.

The cache memory 111 enters a cache ON state or a cache OFF state in response to an instruction provided by a CPU 211 (see FIG. 2) to be detailed later. In the cache ON state, it is allowed to function as a cache memory to enable high-speed data transfer/write operations. Namely, data transmitted from a memory 207 (see FIG. 2) to be described later are stored in the cache memory 111 and excess data overflowing from the cache memory 111 are recorded into the nonvolatile memory 112. Once there is no more data overflow at the cache memory 111, a cache flush is executed for the cache memory 111 in response to an instruction from the CPU 211 so as to transfer and record the data having been saved in the cache memory on a temporary basis into the nonvolatile memory 112. Each time data originating from the memory 207 are received, the data are recorded into the nonvolatile memory 112 via the cache memory 111 in the cache OFF state.

Figure 2:
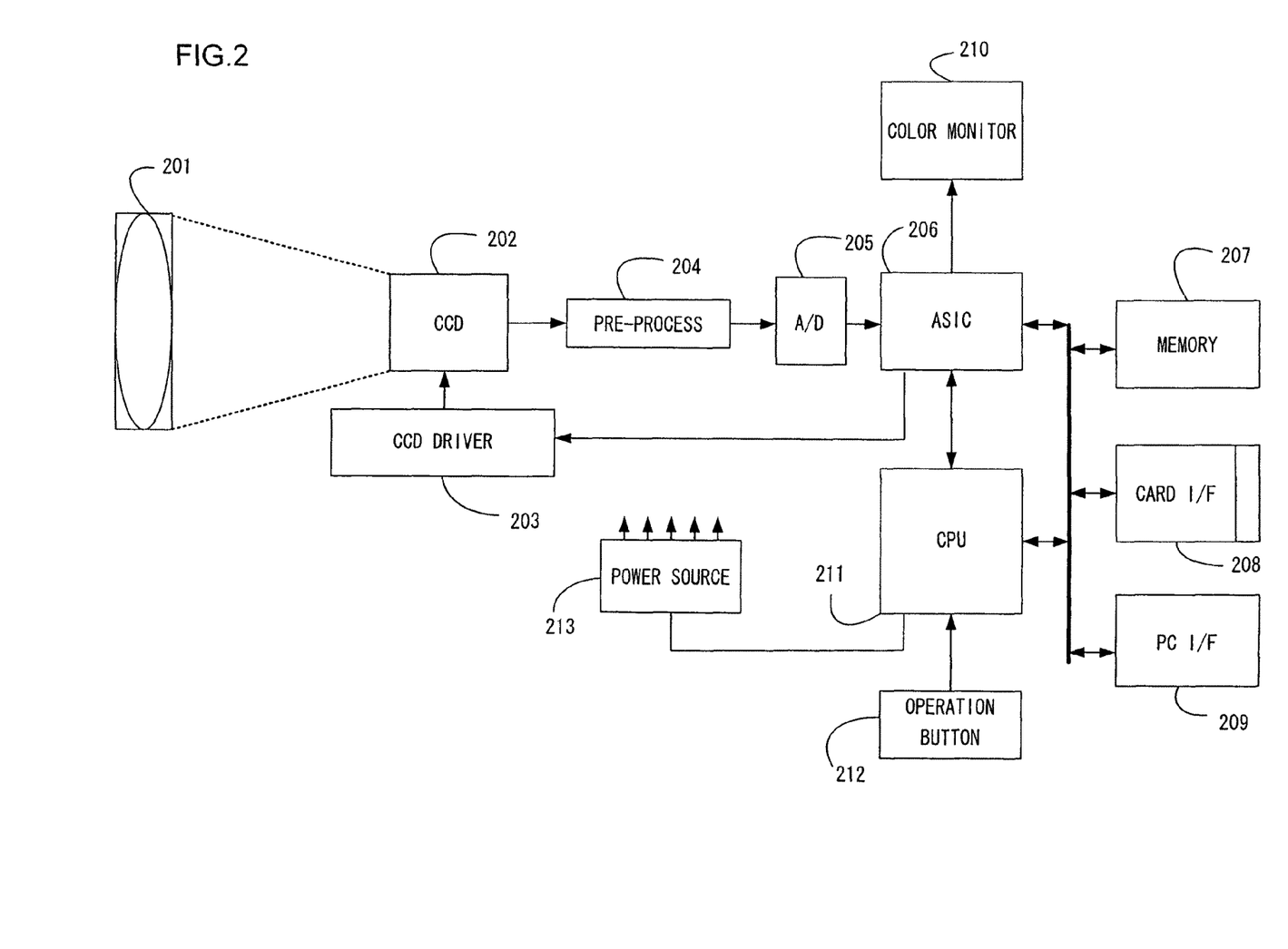
FIG. 2 is a block diagram of the electronic still camera achieved in the embodiment.

FIG. 2 is a detailed block diagram of the electronic still camera 100 assuming the basic structure shown in FIG. 1. In reference to FIG. 2, the individual units constituting the electronic still camera in FIG. 1 are described in more specific terms.

The photographic control unit 101 includes an interchangeable lens 201, an image sensor 202 constituted with a CCD image sensor or the like, a CCD driver 203 that controls data storage and data read at the CCD, a pre-process circuit 204 that executes signal amplification, black level adjustment and the like, an A/D converter 205 that converts analog data to digital data, an image processing unit 206 constituted with an ASIC or the like that executes image processing such as γ correction and white balance adjustment and the memory 207 constituted with a buffer where image data are recorded as compressed files in the JPEG format or a DRAM which functions as a CPU program memory.

The recording medium control unit 102 includes a card I/F 208 which functions as an interface with the detachable storage medium 110. The communication control unit 103 includes a PC I/F 209 which functions as an interface with an externally connected device such as a personal computer in compliance with USB standards. The display control unit 104 includes a color monitor 210 constituted with an LED, an LCD or a TFT, whereas the power control unit 105 includes a power source 213. In addition, the system control unit 106 includes the CPU 211, an operation button 212 by which either a single shot mode or a continuous shooting mode is selected and the like.

—Initialization Processing—

Figure 3:
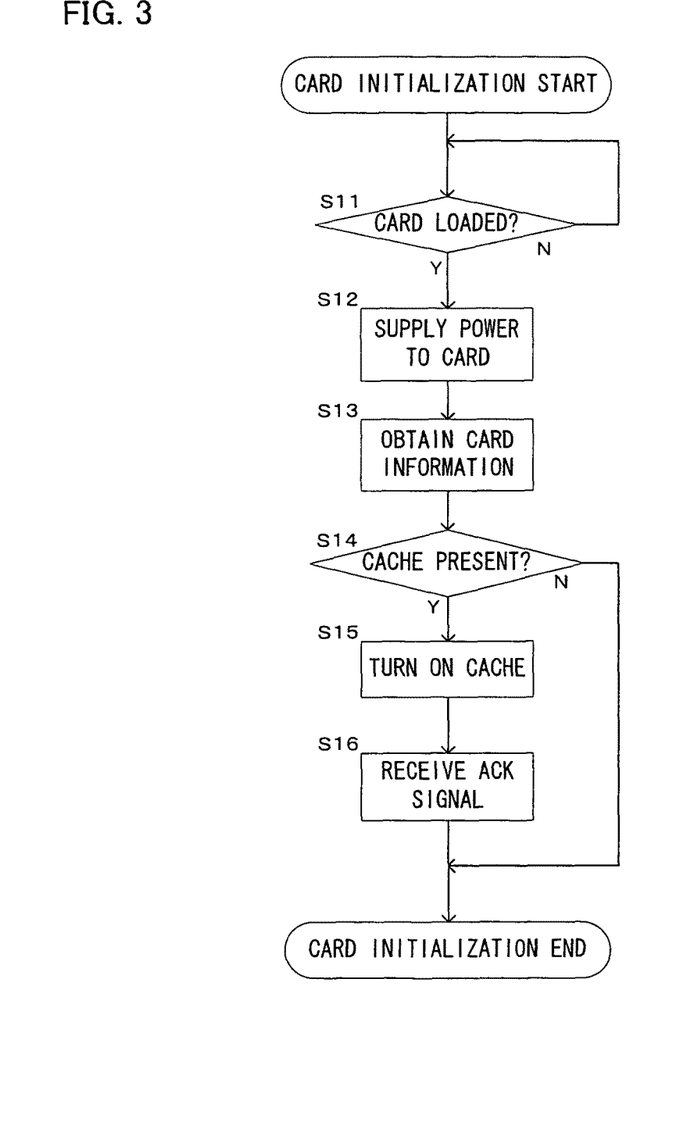
FIG. 3 presents a flowchart of the initialization processing executed to initialize the recording medium in the electronic still camera in the embodiment.

In reference to the flowchart presented in FIG. 3, the initialization processing executed by the CPU 211 to initialize the recording medium 110 is explained. A program based upon which the individual phases of the processing in FIG. 3 are executed is stored in a memory (not shown) within the CPU 211 and the program is started up as a power ON signal is input.

In step S11, a decision is made based upon a signal from the card I/F 208 as to whether or not the recording medium 110 is loaded. If a negative decision is made, i.e. if the recording medium 110 is judged not to be loaded, the operation waits in standby. If an affirmative decision is made, i.e., if the recording medium 110 is judged to be loaded, the operation proceeds to step S12.

In step S12, power is supplied to the recording medium 110 via the card I/F 208, and then the operation proceeds to step S13. In step S13, card information indicating the recording capacity of the recording medium 110, the processing speed of the recording medium, whether or not the recording medium 110 is equipped with the cache memory 111 and the like is obtained via the card I/F 208, before the operation proceeds to step S14.

In step S14, a decision is made based upon the card information obtained in step S13 as to whether or not the recording medium 110 includes the cache memory 111. If an affirmative decision is made, i.e., if the recording medium 110 is judged to include the cache memory 111, the operation proceeds to step S15.

In step S15, a cache ON instruction signal is output to the memory system control unit 113 via the card I/F 208, and then the operation proceeds to step S16. In step S16, an Ack signal generated in response to the cache ON instruction signal is received from the recording medium 110 via the card I/F 208. Once the processing in step S16 is completed, the initialization processing for the recording medium 110 ends. It is to be noted that if a negative decision is made in step S14, i.e., if the recording medium 110 is judged not to include the cache memory 111, the initialization processing for the recording medium 110 ends without executing steps S15 and S16.

—Image File Record Processing—

An image obtained through a photographing operation is compressed into the JPEG format or the like via the CPU 211 and then the compressed image is stored into the memory 207 as image data in the electronic camera. Subsequently, the CPU 211 creates an image file by adding information indicating the photographing conditions and the like to the image data and the image file thus created is written into the recording medium 110.

Figure 4:
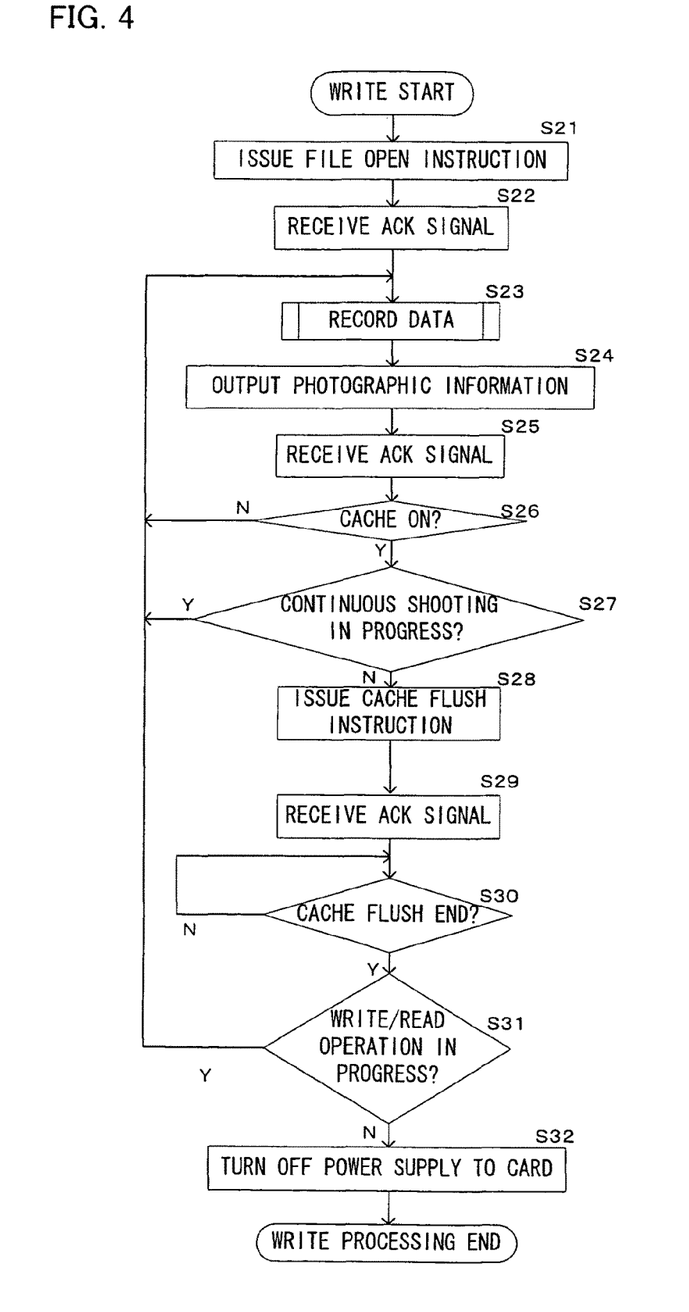
FIG. 4 presents a flowchart of the data write processing executed in the electronic still camera in the embodiment.

The following is an explanation given in reference to the flowchart presented in FIG. 4 on the processing executed to write an image file recorded in the memory 207 into the recording medium 110. The various processing phases in this flowchart, too, are controlled based upon a program executed by the CPU 211. The program based upon which the various processing phases in FIG. 4 are executed is stored in the memory (not shown) in the CPU 211, and is started up as a photographing operation starts. It is assumed that the recording medium 110 has been set in the cache ON state through the initialization explained in reference to FIG. 3.

In step S21, the CPU 211 issues a file open instruction to the memory system control unit 113. Consequently, a file name under which the data to be transferred are to be written is registered in the cache memory 111. Subsequently, the operation proceeds to step S22.

In step S22, an Ack signal generated by the memory system control unit 113 in response to the file open instruction is received from the memory system control unit 113 and then the operation proceeds to step S23. The Ack signal is output as soon as the file name is written in the cache memory 111.

In step S23, a specific image file in the memory 207, divided into, for instance, 512-byte data units, is output to the memory system control unit 113 and the data are sequentially recorded into the recording medium 110. Once all the data are recorded, the operation proceeds to step S24. It is to be noted that the data record processing executed in step S23 is to be described in detail later. In addition, the following explanation is provided by referring to the individual sets of data in the single image file, each constituted with 512-byte data resulting from the image file division, as data 1, data 2, . . . data n in the order matching the sequence through which the individual sets of data are output to the recording medium 110.

Upon ending the image data record processing in step S23, the CPU 211 issues a file close instruction to the memory system control unit 113 in step S24 and then the operation proceeds to step S25. The file close instruction equates to a photographing operation end. It is to be noted that as the file close instruction, photographing operation-related information (photographic information) such as DPOF (digital print order format) constituted with image size information, device information, recording time point information and the like, and protect information is transmitted to the memory system control unit 113.

In step S25, an Ack signal output from the memory system control unit 113 is received before the operation proceeds to step S26. It is to be noted that this Ack signal is output as soon as the photographic information is written into the cache memory 111.

In step S26, a decision is made via the card I/F 208 as to whether or not the recording medium 110 is in the cache ON state. If an affirmative decision is made, i.e., if the recording medium is judged to be in the cache ON state, the operation proceeds to step S27. If, on the other hand, a negative decision is made, i.e., if the recording medium is judged to be in the cache OFF state, the operation proceeds to step S23.

In step S27, a decision is made as to whether or not the photographic control unit 101 is engaged in a continuous shooting operation. If an affirmative decision is made, i.e., if a continuous shooting operation is judged to be in progress, the operation proceeds to step S23. If a negative decision is made, i.e., if it is decided that a continuous shooting operation is not underway, the operation proceeds to step S28.

In step S28, a cache flush instruction signal is output to the memory system control unit 113 before the operation proceeds to step S29. The term "cache flush" is used to refer to processing executed to write all the data written in the cache memory 111 into the nonvolatile memory 112. The cache flush is executed in synchronization with the photographing operation end, i.e., the image record processing end. As a result, the data having been recorded in the cache memory 111 in the overflow-cleared state are written into the nonvolatile memory 112.

In step S29, an Ack signal output from the memory system control unit 113 in response to the cache flush instruction signal is received and then the operation proceeds to step S30.

In step S30, a decision is made as to whether or not a cache flush end signal has been input from the memory system control unit 113. If an affirmative decision is made, i.e., if a cache flush end signal is judged to have been input, the operation proceeds to step S31. If a negative decision is made, on the other hand, the operation waits in standby for an input of a cache flush end signal.

In step S31, a decision is made as to whether or not a write operation or a read operation is in progress at the recording medium 110. If an affirmative decision is made, i.e., if it is decided that the write operation or the read operation has not ended, the operation proceeds to step S23. If a negative decision is made, i.e., if it is decided that the write operation or the read operation has ended, the operation proceeds to step S32.

In step S32, a power supply end signal indicating that the power supply to the recording medium 110 is to end is output to the card I/F 208. As a result, the card I/F 208 turns off the power supply to the recording medium 110.

Figure 5:
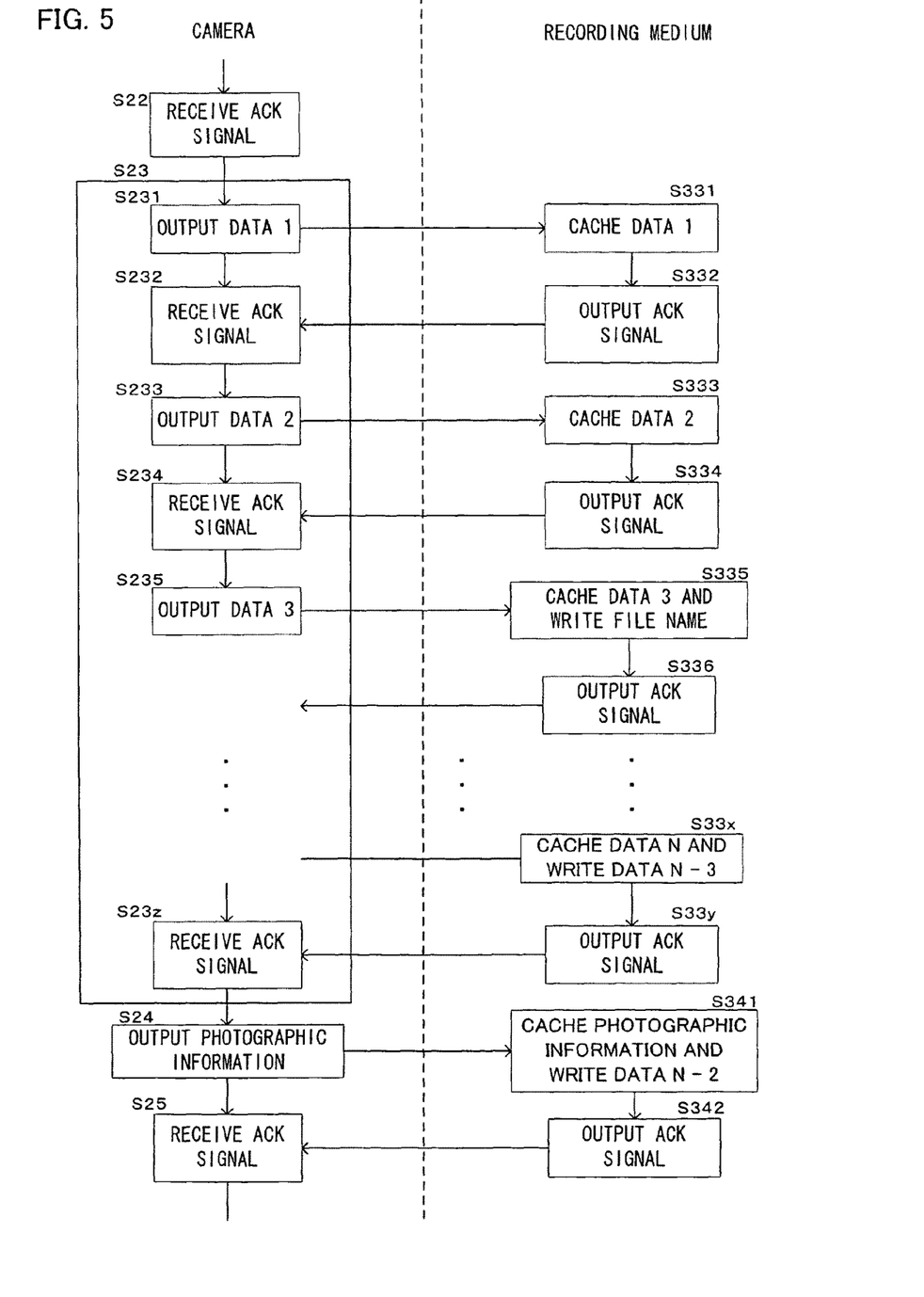
FIG. 5 presents a detailed flowchart of the data record processing executed in the electronic still camera in the embodiment.

The data record processing executed in step S23 in FIG. 4 is now explained in reference to FIG. 5. It is to be noted that while an explanation is given in reference to the embodiment by assuming that the cache memory 111 has a capacity of 1536 bytes, the present invention is not limited to this example.

Upon receiving in step S22 the Ack signal output from the memory system control unit 113 in response to the file open signal, the CPU 211 outputs the data 1 constituted with 512-byte data to the memory system control unit 113 in step S231.

In step S331, the data 1 are input to the memory system control unit 113, which then records the data 1 input thereto into the cache memory 111. Once the data are recorded, the operation proceeds to step S332 in which the memory system control unit 113 outputs an Ack signal to the CPU 211.

After the CPU 211 receives the Ack signal from the memory system control unit 113 in step S232, the operation proceeds to step S233. In step S233, the CPU 211 outputs the data 2 constituted with 512-byte data to the memory system control unit 113.

In step S333, the data 2 are input to the memory system control unit 113, which then records the data 2 input thereto into the cache memory 111. Once the data are recorded, the operation proceeds to step S334 in which the memory system control unit 113 outputs an Ack signal to the CPU 211.

After the CPU 211 receives the Ack signal from the memory system control unit 113 in step S234, the operation proceeds to step S235. In step S235, the CPU 211 outputs the data 3 constituted with 512-byte data to the memory system control unit 113.

In step S335, the data 3 are input to the memory system control unit 113, which then records the data 3 input thereto into the cache memory 111. By this time, the file name, the data 1 and the data 2 are already written in the cache memory 111 and if the cache memory does not have any available capacity, the memory system control unit 113 records the data 3 into the cache memory 113 as it concurrently transfers the file name to the nonvolatile memory 112. Namely, as a data overflow occurs at the cache memory 111, data are written into the nonvolatile memory 112. Once the data 1 are written into the nonvolatile memory 112, the operation proceeds to step S336 in which the memory system control unit 113 outputs an Ack signal to the CPU 211.

Subsequently, the processing described above is repeatedly executed until the last set of data n is recorded in the cache memory 111, the data n–3 are written into the nonvolatile memory 112 and the memory system control unit 113 outputs an Ack signal to the CPU 211, and the operation then proceeds to step S24.

—External Device Connection—

Figure 6:
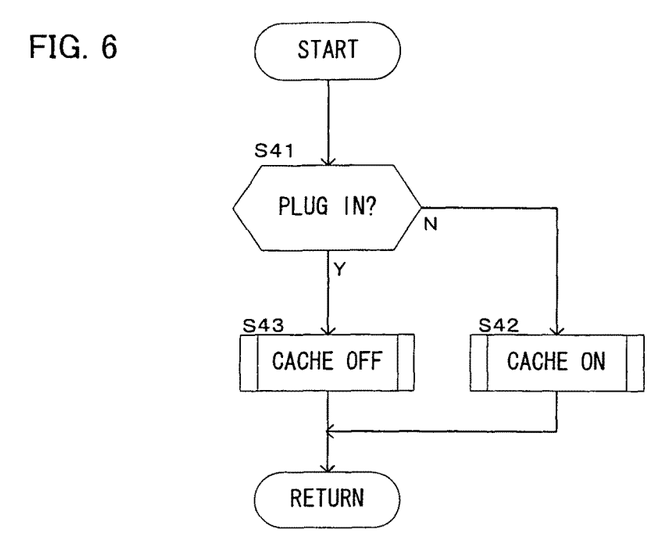
FIG. 6 presents a flowchart of the processing executed in the electronic still camera when it is connected to an external device in the embodiment.

Next, the processing executed when the electronic still camera is connected to an external device such as a personal computer or a wireless LAN via the PC I/F 209 is explained in reference to the flowchart presented in FIG. 6. It is to be noted that the processing shown in this flowchart, too, is controlled based upon a program executed by the CPU 211. The program based upon which the individual processing phases in FIG. 6 are executed is stored in the memory (not shown) in the CPU 211 and is started up as a power ON signal is input.

In step S41, a decision is made as to whether or not a plug IN signal output from the PC I/F 209 has been input. If a negative decision is made, i.e., if no plug IN signal has been input and thus the electronic still camera is judged not to be connected with an external device, the operation proceeds to step S42. If an affirmative decision is made, i.e., if a plug IN signal has been input and thus the electronic still camera is judged to be connected with an external device, the operation proceeds to step S43.

In step S42, a cache ON instruction signal is output to the memory system control unit 113 via the card I/F 208, so as to validate the cache memory 111. Namely, the cache function is engaged. In step S43, a cache OFF instruction signal is output to the memory system control unit 113 via the card I/F 208, so as to invalidate the cache memory 111. In other words, the cache function is disengaged. It is to be noted that if the cache function is invalidated, data are temporarily stored in the cache memory 111 and the data stored in the cache memory are transferred and recorded into the nonvolatile memory 112 in response to a write command.

Figure 7:
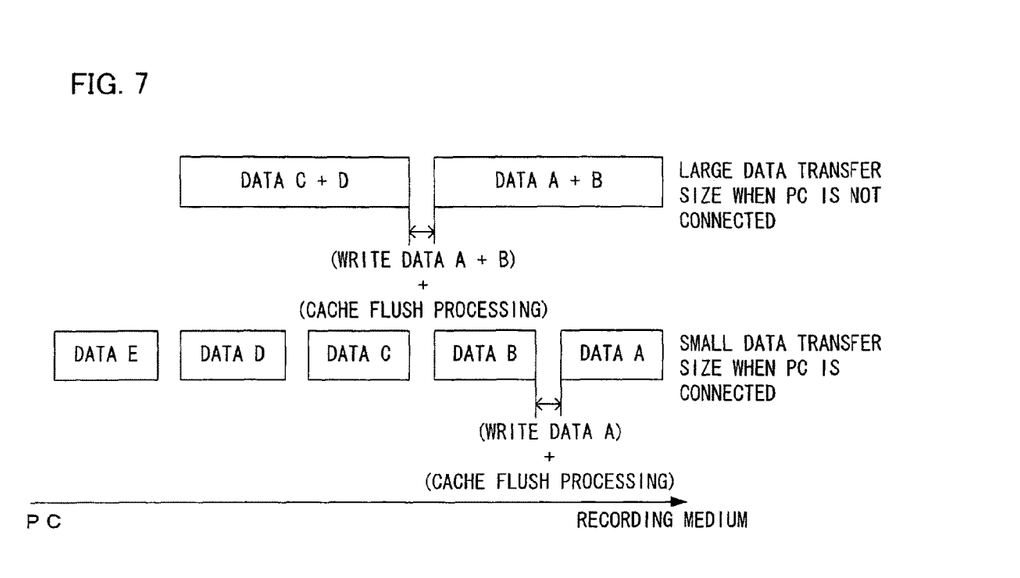
FIG. 7 is a conceptual diagram illustrating a method that may be adopted when recording data transferred from the external device into the recording medium.

The procedure through which an image file originating from an externally connected device is recorded into the recording medium 110 in the cache OFF state is now explained in reference to FIG. 7.

Sets of data A through E in FIG. 7 are data to be transferred from the externally connected device to the recording medium 110. The sizes of the individual sets of data A, B, C D and E are each smaller than a capacity of the cache memory 111. Namely, the CPU 211 issues an instruction for the externally connected device via the PC I/F 209 to ensure that each set of data transferred to the recording medium 110 is smaller than the capacity of the cache memory 111. The data A with a small data volume, are transferred to the cache memory 111 where they are temporarily stored. The data A are then written into the nonvolatile memory 112 even if the cache memory 111 does not overflow. As the CPU 211 reports to the externally connected device via the PC I/F 209 that the write of the data A into the nonvolatile memory 112 has been completed, the externally connected device transfers the next set of data B and subsequently, the processing described above is repeatedly executed until the transfer of all the data is completed.

The following advantages are achieved in the electronic still camera in the embodiment described above.

Figure 8A:
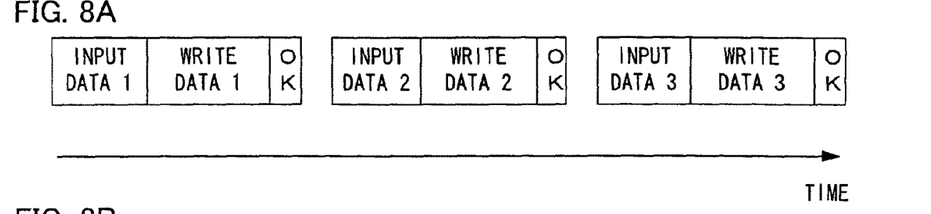
FIGS. 8A and 8B are conceptual diagrams each illustrating a method that may be adopted when recording data into the recording medium, with FIG. 8A illustrating a method that does not utilize the cache memory and FIG. 8B illustrating a method that does utilize the cache memory.
Figure 8B:
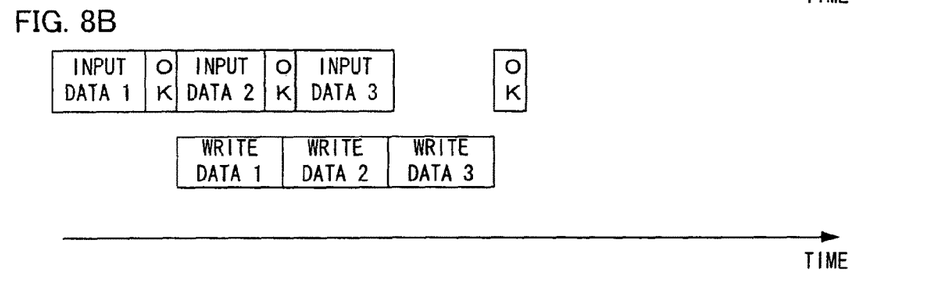

(1) The cache function of the cache memory 111 included in the detachable recording medium 110 is validated in response to an instruction issued by the CPU 211. In the related art, even if the recording medium 110 loaded into a camera or the like includes a cache memory 111, the cache function is not validated and instead, each time to data are input, the input data are written into the nonvolatile memory 112 as shown in FIG. 8A. In contrast, the cache function is validated in the embodiment so as to write data overflowing from the cache memory 111 into the nonvolatile memory 112 while inputting data into the cache memory 111, as shown in FIG. 8B, thereby assuring improved processing efficiency.

(2) A cache flush is executed for any data recorded in the cache memory 111 at the photographing operation end. Namely, while the photographing operation is in progress, a cache flush is disallowed and the data transfer to the recording medium 110 alone is executed. The cache flush is then executed only after the last set of data is transferred to the recording medium 110. This means that the cache flush can be executed with a lighter processing load compared to the load of cache flush processing executed each time data are transferred. As a result, data can be recorded into the recording medium 110 with a high level of efficiency.

(3) Any data stored in the cache memory 111 constituted with a volatile memory are lost as soon as the power supply to the recording medium 110 is turned off. In the embodiment, the CPU 211 outputs the power supply end signal to end the power supply to the recording medium 110 only after a cache flush processing end signal originating from the memory system control unit 113 is input thereto. As a result, all the photographic data can be saved reliably by ensuring that no data are lost before being recorded.

(4) While image data for a single image are recorded as a file into the recording medium 110 in the electronic still camera 100, the processing load of the cache flush processing is bound to be significant if the cache flush is executed each time a file is recorded. In particular, if the cache flush is executed in correspondence to each image file while the photographing operation in the continuous shooting mode is in progress, the continuous shooting operation is bound to be adversely affected to result in a lowered frame speed. Accordingly, the cache flush processing is executed in correspondence to each image as long as the photographing operation is executed in the single shot mode but the cache flush processing is executed only after the entire photographing operation is completed if the photographing operation is executed in the continuous shooting mode in the embodiment. Thus, the processing load of the cache flush processing is reduced and also, execution of the cache flush processing is not allowed to adversely affect the photographing operation.

(5) The cache flush processing is executed only after the file close instruction data including the photographic information such as DPOF are recorded into the cache memory 111. Thus, the information needed when printing the image can be reliably recorded into the recording medium 110.

(6) An externally connected device such as a personal computer transfers data by dividing the data into smaller data units and thus, the data sizes of the individual sets of data transferred from the personal computer are bound to be small. For this reason, the overhead of the cache flush processing is bound to be significant if the cache memory stays in the cache ON state. Accordingly, the cache is turned off when an external device such as a personal computer is connected to the electronic still camera, so as to completely eliminate the overhead related to the cache flush processing.

Figure 9:
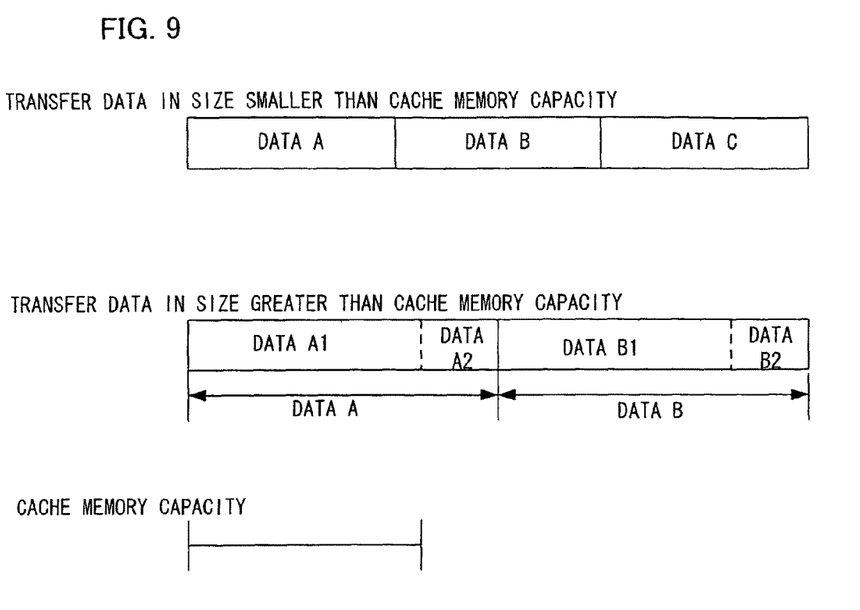
FIG. 9 shows the length of processing time required to write data transferred from the external device, the data size of which is greater than the cache memory capacity and the length of processing time required to write data from the external device, the data size of which is smaller than the cache memory capacity, in comparison to each other.

(7) The cache memory 111 is set in the cache OFF state when an external device such as a personal computer is connected to the electronic still camera and transfer data are divided into data units with data volumes smaller than the capacity of the cache memory 110 for the data transfer under these circumstances. In the cache OFF state, sets of data resulting from the division and transferred to the recording medium are temporarily stored into the cache memory 111. This means that as a set of data with a data volume smaller than the capacity of the cache memory 110 is transferred, the particular set of data can be stored into the cache memory 111 and then recorded into the nonvolatile memory 112 through a single processing session. As a result, only a single write processing session needs to be executed for each set of data among sets of data a, b and c assuming data sizes smaller than the capacity of the cache memory 111 and thus, a total of only three write processing sessions needs to be executed for the entire data, as shown in FIG. 9.

However, if data with a data size greater than the capacity of cache memory 111 are transferred, only a portion of the data, the volume of which matches the capacity of the cache memory 111, is stored into the cache memory 111. The data thus stored are then written into the nonvolatile memory 112. Subsequently, the excess portion of the data beyond the capacity of cache memory 111, which has not been stored into the cache memory 111 earlier, is stored in the cache memory 111 and is recorded into the nonvolatile memory 112. In other words, a set of data resulting from the data division and transferred to the recording medium needs to be stored into the cache memory 111 and written into the nonvolatile memory 112 through multiple write processing sessions. For instance, sets of data A and B with matching data sizes, resulting from data division and transferred to the recording medium each require two write processing sessions, as illustrated in FIG. 9. Namely, the data A need to be written through two write processing sessions, one for data A1 and the other for data A2 and likewise, the data B need to be written through two write processing sessions, one for data B1 and the other for data B2. Thus, a total of four write processing sessions must be executed for the entire data. In other words, the length of time required to process the entire transfer data to be transferred may be shortened to improve the processing speed by transferring the data in the divided smaller data units with a data volumes smaller than the capacity of the cache memory 111.

The electronic still camera achieved in the embodiment described above allows for the following variations (1) through (6).

(1) Depending upon the volume of image data to be transferred, the length of time required for the processing may be reduced by invalidating the cache function rather than by validating the cache function. Accordingly, if it is decided during the initialization processing executed for the recording medium 110 that the write processing at the nonvolatile memory 112 can be executed at higher speed than the write processing at the cache memory 111 in the recording medium 110, the CPU 211 may turn off the cache function. The processing executed under these circumstances is now explained.

Decision-making executed with regard to the write processing speed in the cache ON state and the write processing speed in the cache OFF state when transferring image data from the electronic still camera 100 to the recording medium 110 is now described.

Image data with a data size L recorded in the memory 207 of the electronic still camera 100 are divided into data units matching specific write units S with which data are written in the recording medium 110 and the image data are thus transferred in the data units to the recording medium 110 by the CPU 211. The write units S may correspond to, for instance, the write sector size assumed at the recording medium 110. The CPU 211 transfers n sets of data with the sector size S in succession through a single transfer processing session. The n sets of data with the sector size S transferred through this transfer processing session may be regarded as a single group of data, and the data size of such a group of data may be referred to as a cluster size. M representing the cluster size may be expressed as follows.

$$M = S \times n \tag{1}$$

Assuming that the image data are constituted with m groups of data with the cluster size M, the data size L of the image data can be expressed as follows.

$$L = M \times m = S \times n \times m \tag{2}$$

Figure 10A:
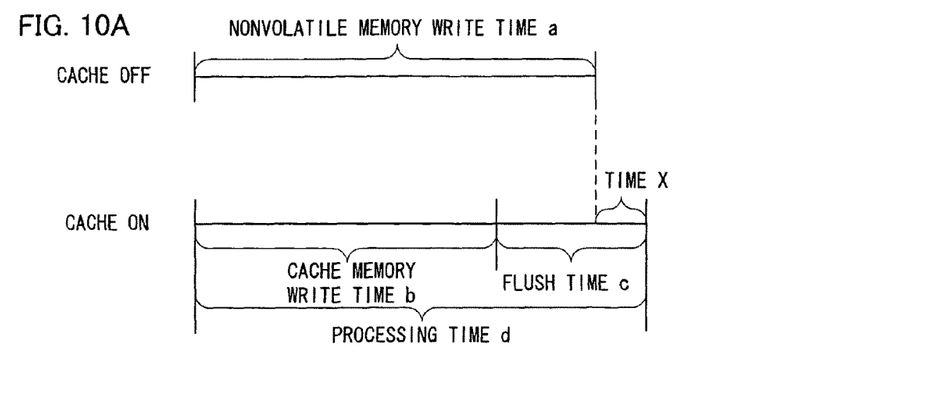
FIGS. 10A and 10B show the lengths of processing time required when image data are transferred from the electronic still camera to the recording medium, with FIG. 10A showing the lengths of processing time required when the data are transferred in units corresponding to the sector size and FIG. 10B showing the lengths of processing time required when the data are transferred in units corresponding to the cluster size.
Figure 10B:
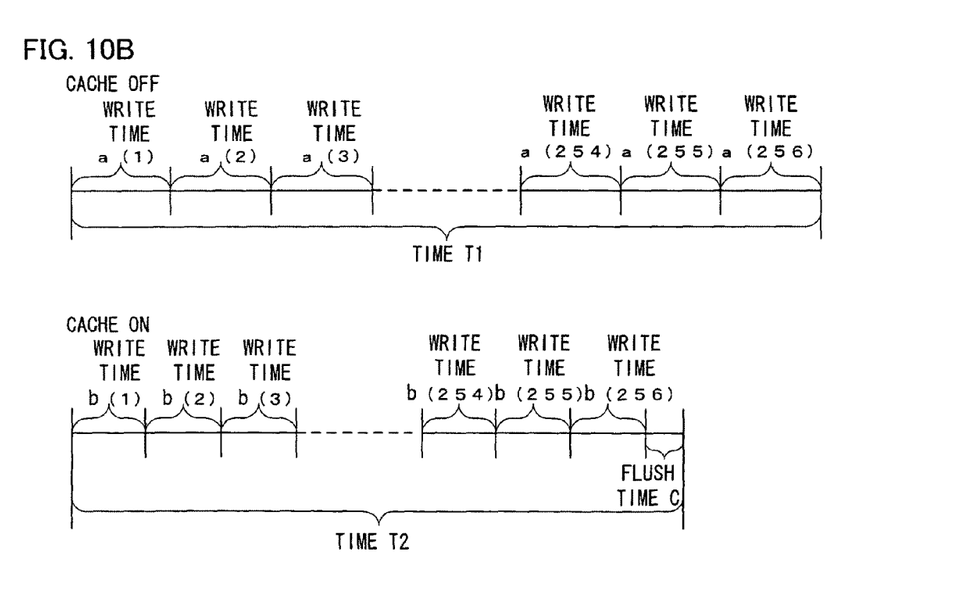

Next, in reference to FIGS. 10A and 10B, varying lengths of processing time required when transferring image data from the electronic still camera 100 to a specific recording medium 110 are explained. In the following explanation, it is assumed that the write units S represented by the sector size each correspond to 512-byte data and that the cluster size M matches 128 KB data. Accordingly, based upon expression (1), n is determined to be 256.

The lengths of processing time required when the CPU 211 transfers and records data with the sector size S into the specific recording medium 110 are explained in reference to FIG. 10A. As shown in FIG. 10A, the length of time required to write the data with the sector size S into the nonvolatile memory 111 in the recording medium 110 is a in the cache OFF state. The length of processing time d required to write the data with the sector size S into the cache memory 112 in the recording medium 110 and execute the cache flush for the cache memory 112 in the cache ON state is expressed as in (3) below.

$$d = b + c \quad (3)$$

It is to be noted that the time b is the length of time required when writing the data into the cache memory 111 and the time c is the length of time required to execute the cache flush, i.e., the length of time required when writing the data present in the cache memory 111 into the nonvolatile memory 112.

As shown in FIG. 10A, the length of time b required when writing the data into the cache memory 111 in the cache ON state is smaller than the length of time "a" required to write the data into the nonvolatile memory 112 in the cache OFF state. However, the overall processing time in the cache ON state includes the length of time c required to flush the cache memory 111. Accordingly, the total length of time required to process a single set of data assuming the sector size S increases by a time length x when the data are transferred in the cache ON state. This is by no means a universal phenomenon that occurs in all recording media 110, but a phenomenon that occurs only in some specific recording media 110. In other words, the camera is able to ascertain whether or not the recording medium 110 loaded therein is prone to the phenomenon described above by recognizing the type of recording medium 110.

In reference to FIG. 10B, the lengths of processing time required when the CPU 211 transfers and records in succession data assuming the cluster size M, i.e., when the CPU 211 transfers and records 256 sets of data with a sector size S are explained. The length of time T1 required to write data with the cluster size M into the nonvolatile memory 112 in the cache OFF state is expressed as follows.

$$T1 = n \times a \quad (4)$$

The length of time T2 required to write data with a cluster size M into the cache memory 111 in the cache ON state is expressed as follows.

$$T2 = n \times b + c \quad (5)$$

As explained earlier, the length of processing time required to write a single set of data with the sector size S is smaller in the cache ON state than in the cache OFF state. A single set of data with the cluster size M can be written over a smaller length of time in the cache ON state, as shown in FIG. 10B. Namely, depending upon the volume of the individual sets of data to be transferred in succession, e.g., the actual volume of data in the cluster size M, either the cache ON state or the cache OFF state can be determined to be the state in which the data can be written over a smaller length of time.

The length of time a required when writing data into the nonvolatile memory 112 in the cache OFF state, the length of time b required when writing data into the cache memory 111 in the cache ON state and the length of time c required for the cache flush processing mentioned above each assume a value determined in correspondence to the characteristics of the cache memory 111 and the nonvolatile memory 112. The data write time lengths a and b and the flush time length c are all recorded into a ROM, a NAND memory or the like (not shown) when the recording medium 110 is manufactured.

During the initialization processing for the recording medium 110, the CPU 211 reads out the data write time lengths a and b and the flush time length c from the system control unit 113. The CPU 211 then compares the time length T1 with the time length T2 calculated as expressed in (4) and (5). If the comparison results indicate that the time length T1 is greater than the time length T2, i.e., if it is decided that the data write processing can be executed faster in the cache ON state than in the cache OFF state, the CPU 211 validates the cache memory 111 in the recording medium 110. If, on the other hand, the time length T1 is judged to be equal to or less than the time length T2, the length of time required for the data write processing will be greater in the cache ON state than in the cache OFF state. Accordingly, the CPU 211 does not validate the cache memory 111 in the recording medium 110.

(2) Instead of recording the data write time lengths a and b required to write image data into the recording medium 110 and the flush time length c into the recording medium 110, the time lengths T1 and T2 required when processing image data assuming the cluster size M may be recorded. In such case, the CPU 211 is able to determine whether the write processing can be executed faster in the cache ON state or in the cache OFF state without having to calculate the time lengths T1 and T2.

(3) Instead of transferring image data divided into data portions each matching the write unit S determined in correspondence to the sector size of the recording medium 110, the image data may be divided into data portions each corresponding to the minimum transfer unit P by the electronic still camera 100 for purposes of data transfer irrespective of the sector size S assumed in the recording medium 110. In such a case, during the initialization processing executed for the recording medium 110, the CPU 211 transfers image data with a data volume matching the minimum transfer unit P from the memory 207 to the recording medium 110 to measure the length of time required for the write processing.

The write processing time measurement mentioned above is now described in further detail. The CPU 211 sets the recording medium 110 in the cache OFF state and transfers image data with a data volume matching the minimum transfer unit P to the cache memory 111. The CPU 211 then measures the length of time required to write the transferred image data into the nonvolatile memory 112. The length of time thus measured is the data write time length a. In addition, the CPU 211 sets the recording medium 110 in the cache ON state, transfers a single set of image data corresponding to the minimum transfer unit P to the cache memory 111, flushes the cache memory 111 and measures the length of time d required to write the data into the nonvolatile memory 112. Also, the CPU 211 transfers n sets of image data each corresponding to the minimum transfer unit P to the cache memory 111, flushes the cache memory 111 and measures the length of time e required to write the n sets of data into the nonvolatile memory 112. Subsequently, the CPU 211 calculates the flush time length c as expressed below.

$$c = ((d \times n) - e)/(n-1) \quad (6)$$

Based upon the processing time length d having been measured and the flush time length c calculated as expressed in (6) above, the CPU 211 calculates the data write time length b required to write data into the cache memory 111, as expressed below.

$$b = d - c \quad (7)$$

The CPU 211 records the data write time length a measured as described above and the data write time length b and the flush time length c calculated based upon the measurement results into a specific recording area within the CPU 211 or into a specific recording area in the recording medium 110. Subsequently, the CPU 211 references these time lengths a, b and c whenever it needs to determine whether to set the recording medium 110 in the cache ON state or in the cache OFF state.

(4) The CPU 211 may measure the time lengths T1 and T2 required to write image data assuming the cluster size M as it records the image data into the recording medium 110. In such a case, the CPU 211 transfers a first set of image data to the recording medium 110 in the cache OFF state and measures the length of time T1 required to write the image data assuming the cluster size M. The CPU 211 then transfers a second set of image data to the recording medium 110 in the cache ON state and measures the length of time T2 required to write image data assuming the cluster size M. The CPU 211 compares the time length T1 with the time length T2 both obtained through the measurement and selects either the cache ON state or the cache OFF state. Namely, if the time length T1 indicates a smaller value, the CPU 211 sets the recording medium 110 in the cache OFF state, whereas if the time length T2 indicates a smaller value, the CPU 211 selects the cache ON state for the recording medium 110. A third set of image data and subsequent sets of image data are then transferred to the recording medium in the selected state.

After selecting the cache ON state or the cache OFF state based upon the time lengths T1 and T2 ascertained through the measurement, as described above, the CPU 211 may record state information indicating the setting state selected for the recording medium 110 into a specific recording area in the CPU 211 or the recording medium 110. Once the state information is recorded as described above, the CPU 211 only needs to read out the state information having been recorded and indicate either the cache ON state or the cache OFF state to the recording medium 110 whenever the same recording medium 110 is subsequently loaded into the electronic still camera 100. In other words, the CPU 211 does not need to re-execute the time measurement or the time length comparison multiple times.

(5) The time lengths T1 and T2 may be measured as described below by switching from the cache OFF state to the cache ON state while the CPU 211 transfers image data to the recording medium 110. Namely, the CPU 211 transfers a first set of image data assuming the cluster size M to the recording medium 110 in the cache OFF state, writes the image data into the nonvolatile memory 112 and measures the time length T1. The CPU 211 then switches the recording medium 110 to the cache ON state, transfers a second set of image data assuming the cluster size M to the recording medium and measures the time length T2 representing the total sum of the data write time length required to write data into the cache memory 111 and the cache flush time length. The CPU 211 compares the time length T1 with the time length T2 both obtained through the measurement and determines whether to transfer a third set of image data and subsequent sets of image data each assuming the cluster size M in the cache OFF state or in the cache ON state. Namely, if the time length T1 indicates a smaller value, the CPU 211 sets the recording medium 110 in the cache OFF state, whereas if the time length T2 indicates a smaller value, the CPU 211 selects the cache ON state for the recording medium 110. The third set of image data and subsequent sets of image data each assuming the cluster size M are then transferred to the recording medium 110 in the selected state.

(6) Instead of outputting the cache flush instruction signal to the recording medium 110 immediately after transferring the entire image data, the CPU 211 may constantly output the cache flush instruction signal over predetermined regular intervals while the photographing sequence is not in progress. It is to be noted that the CPU 211 should output the cache flush instruction signal without allowing the regular interval to elapse if disengagement of the recording medium 110 is detected. These measures ensure that all the photographic data are reliably saved by preventing any data from remaining unrecorded due to a disconnection of the recording medium 110 from the electronic camera by the user before the CPU 211 issues the cache flush instruction following a photographing end. It is to be noted that the extraction of the recording medium 110 may be detected by a detection mechanism such as a switch provided to detect an opening operation of, for instance, the card insertion slot cover (card lid) (not shown).

(7) The CPU 211 may output the cache flush instruction signal if transfer processing for transferring image data to the recording medium 110 is not executed for a predetermined length time following the image data transfer processing.

(8) The CPU 211 may output the cache flush instruction signal upon detecting disengagement of the recording medium 110. It is to be noted that if the electronic still camera 100 is in the power off state, the CPU 211 should turn on the power to the electronic still camera 100 upon detecting disengagement of the recording medium 110, i.e., upon detecting an opening operation of the card lid. The CPU 211 should then output the cache flush instruction signal to the recording medium 110.

In addition, as long as the features characterizing the present convention are not compromised, the present convention is not limited to the embodiment described above and allows for any other mode of implementation within the scope of the technical teachings of the present convention. For instance, the electronic camera does not need to have all the functions described above. An electronic camera capable of executing the initialization shown in FIG. 3 alone, the processing shown in FIGS. 3, 4 and 5 alone, or the processing shown in FIG. 6 alone, too, may embody the present convention.

What is claimed is:

1. A camera, comprising:
    an internal memory in which data are recorded;
    a loading unit at which a recording medium is to be loaded, the recording medium including at least a nonvolatile memory and a cache memory; and
    a control unit that executes a first control procedure by chronologically executing:
        a first processing where first data output from the internal memory are recorded into the cache memory;
        a second processing where second data output from the internal memory are recorded into the cache memory without recording, into the nonvolatile memory, the first data recorded into the cache memory; and
        a third processing where, in a case of recording third data output from the internal memory into the cache memory, if the cache memory does not have capacity for recording the third data, the first data recorded into the cache memory are recorded into the nonvolatile memory and the third data are recorded into the cache memory, without recording, into the nonvolatile memory, the second data recorded into the cache memory.

2. A camera according to claim 1, wherein the control unit is further capable of executing a second control procedure by chronologically executing:

a fourth processing where the first data output from the internal memory are recorded into the cache memory;

a fifth processing where the first data recorded in the cache memory are recorded into the nonvolatile memory;

a sixth processing where the second data output from the internal memory are recorded into the cache memory;

a seventh processing where the second data recorded in the cache memory are recorded into the nonvolatile memory;

an eighth processing where the third data output from the internal memory are recorded into the cache memory; and a ninth processing where there third data recorded in the cache memory are recorded into the nonvolatile memory, and wherein the control unit selects and executes one of the first and the second control procedures.

3. A camera according to claim 2, further comprising:

a processing time detection unit that detects whether or not a second processing time length is longer than a first processing time length, the first processing time length being time length consumed for all of the first, the second and the third data output from the internal memory to be recorded into the nonvolatile memory based upon the first control procedure, and the second processing time length being time length consumed for all of the first, the second and the third data output from the internal memory to be recorded into the nonvolatile memory based upon the second control procedure, wherein the control unit executes the first control procedure if the processing time detection unit detects that the second processing time length is longer than the first processing time length, and the control unit executes the second control procedure if the processing time detection unit detects that the second processing time length is not longer than the first processing time length.

4. A camera according to claim 3, further comprising:

an arithmetic operation unit that determines through arithmetic operation the first processing time length and the second processing time length.

5. A camera according to claim 1, wherein the control unit chronologically executes the first processing, the second processing, the third processing and a processing where both of the second data and the third data recorded in the cache memory are recorded into the nonvolatile memory.

6. A camera according to claim 1, wherein the camera is configured to an electronic still camera.

7. A camera system comprising a camera and a recording medium, wherein:

the recording medium comprises:
a nonvolatile memory; and
a cache memory;

and the camera comprises:
an internal memory in which data are recorded;
a loading unit at which the recording medium is to be loaded; and
a control unit that executes a first control procedure by chronologically executing:
a first processing where first data output from the internal memory are recorded into the cache memory;
a second processing where second data output from the internal memory are recorded into the cache memory without recording, into the nonvolatile memory, the first data recorded into the cache memory; and
a third processing, where, in a case of recording third data output from the internal memory into the cache memory, if the cache memory does not have capacity for recording the third data, the first data recorded into the cache memory are recorded into the nonvolatile memory and the third data are recorded into the cache memory, without recording, into the nonvolatile memory, the second data recorded into the cache memory.

* * * * *